United States Patent
Feder et al.

(10) Patent No.: US 12,369,071 B2
(45) Date of Patent: Jul. 22, 2025

(54) SYSTEM AND METHOD FOR REDUCING NETWORK COMPONENT LOADS

(71) Applicant: Verizon Patent and Licensing Inc., Basking Ridge, NJ (US)

(72) Inventors: Peretz Feder, Englewood, NJ (US); Anthony Clay Reynolds, Rhome, TX (US); Sachin Vargantwar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 465 days.

(21) Appl. No.: 17/929,869

(22) Filed: Sep. 6, 2022

(65) Prior Publication Data
US 2024/0080704 A1 Mar. 7, 2024

(51) Int. Cl.
*H04W 28/02* (2009.01)
*H04L 47/2425* (2022.01)

(52) U.S. Cl.
CPC ..... *H04W 28/0257* (2013.01); *H04L 47/2425* (2013.01); *H04W 28/0215* (2013.01)

(58) Field of Classification Search
CPC .......... H04W 28/0257; H04W 28/0215; H04L 47/2425
See application file for complete search history.

(56) References Cited

U.S. PATENT DOCUMENTS

| | | | |
|---|---|---|---|
| 2019/0222489 A1* | 7/2019 | Shan | H04L 12/1407 |
| 2020/0112907 A1* | 4/2020 | Dao | H04M 15/8016 |

OTHER PUBLICATIONS

3GPP TS 28.552 V17.7.1 (Jun. 2022). Technical Specification. 3rd Generation Partnership Project; Technical Specification Group Services and System Aspects; Management and orchestration; 5G performance measurements (Release 17). 309 pages.

* cited by examiner

*Primary Examiner* — Natasha W Cosme

(57) ABSTRACT

A system comprises one or more devices that implement network functions (NFs). The NFs comprise a network data analytics function (NWDAF) configured to provide first analytics to a policy control function (PCF). In addition, the NFs also comprise the PCF configured to: receive the first analytics from the NWDAF; generate a first policy rule based on the first analytics; and forward the generated first policy rule to a network component to process the first policy rule at the network component.

20 Claims, 12 Drawing Sheets

US 12,369,071 B2

SYSTEM AND METHOD FOR REDUCING NETWORK COMPONENT LOADS

BACKGROUND INFORMATION

Monitoring a network involves collecting values of operational parameters not only from physical network components, but also from logical network components. For example, a monitoring system may measure and track traffic volumes to/from devices, traffic volumes over logical and physical links/paths, and latency associated with physical and logical paths. The network may use the collected information to detect faults, optimize network performance, and implement recovery procedures.

DETAILED DESCRIPTION OF EXAMPLE EMBODIMENTS

The following detailed description refers to the accompanying drawings. The same reference numbers in different drawings may identify the same or similar elements. As used herein, the term "heavy load" may refer to a volume of network traffic or an amount of consumed resource (e.g., memory used, and/or processing cycles) that is greater than a particular threshold at a network component or a user plane associated with one or more network components. For example, a router or network component that is under a heavy load may be handling more than a specified volume of traffic or spending more than a threshold number of cycles for processing data flows. As used herein, the term "network component" may refer to a hardware network device, a logical network device (e.g., a virtual machine), or a logical network element, or a logical network construct, such as a data session.

Figure 1:
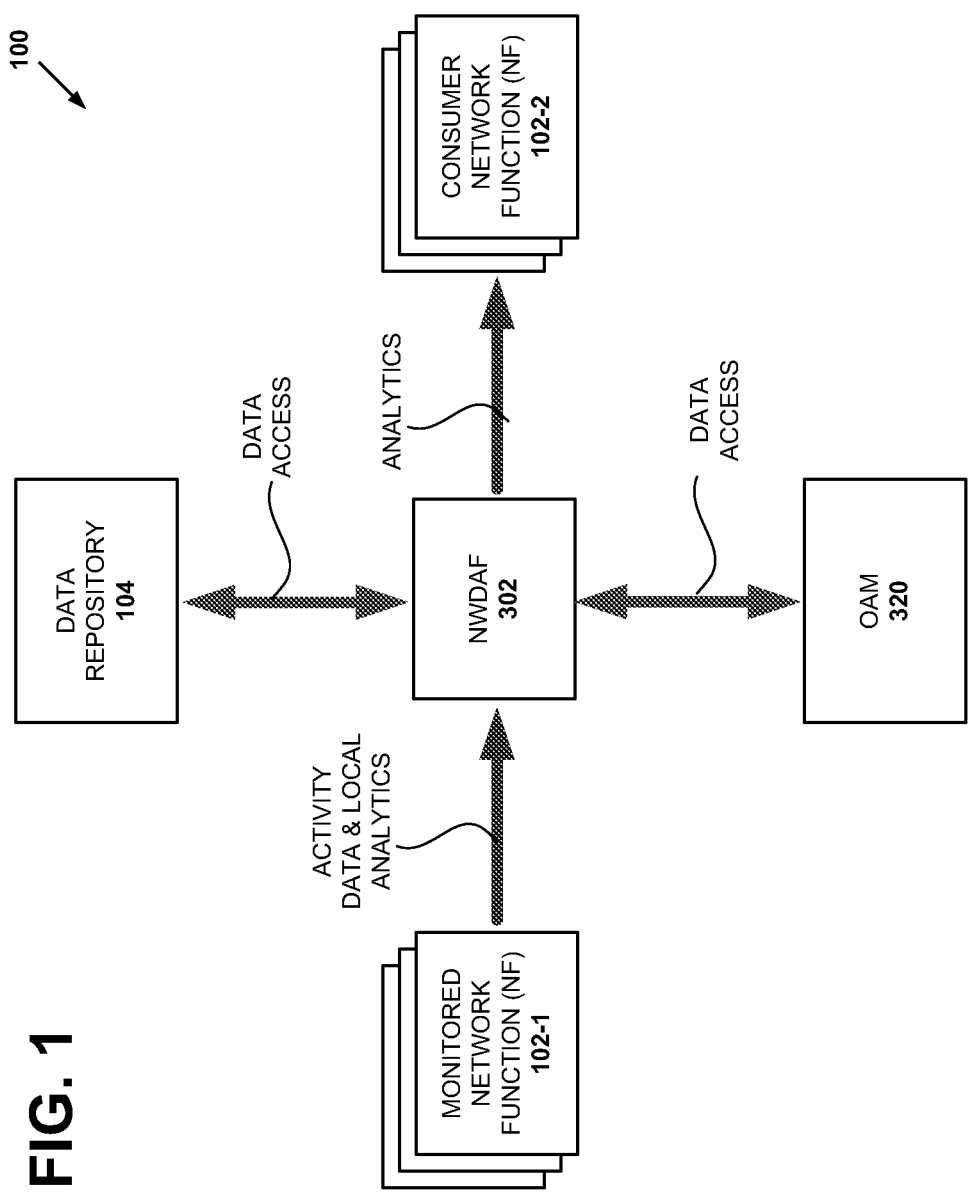
FIG. 1 illustrates an overview of systems and methods for reducing network loads at various components.

The systems and methods described herein relate to reducing or avoiding heavy loads at network components. FIG. 1 illustrates an overview of the systems described herein. As shown, system 100 may include monitored network functions (NFs) 102-1, a Network Data Analytics Function (NWDAF) 302, a data repository 104, an Operation, Administration, Management platform (OAM) 320, and consumer network functions 102-2.

Monitored NFs 102-1 include one or more physical network components or logical network components, each of which has a particular set of network functionalities. Example NFs are described in greater detail with reference to FIGS. 2 and 3. As shown in FIG. 1, monitored NFs 102-1 generate or are used to generate activity data and/or local analytics. The activity data and the local analytics are provided to NWDAF 302, either directly from monitored NFs 102-1 or from monitoring agents and mechanisms.

NWDAF 302 receives activity data and/or local analytics from monitored NFs 102-1 and generates its own analytics (herein referred to NWDAF analytics). NWDAF 302 may provide all or some of the NWDAF analytics to consumer NFs 102-2 and OAM 320. Data repository 104 may store data from NWDAF 302 and provides data for use to NWDAF 302. The data may include not only NWDAF analytics, but also activity data and local analytics that NWDAF 302 passed from monitored NFs 102-1 to data repository 104.

OAM 320 may perform tasks for operation, administration, and/or maintenance (or management) of the network. OAM 320 is described in greater detail with reference to FIG. 3.

Consumer NFs 102-2 may receive services from producer NFs. A consumer NF may also be a producer NF, and the nomenclature refers to the role of a consumer that the NF takes on with respect to a particular service, rather than a rigid or particular category. Consumer NFs 102-2 receive the analytics service from NWDAF 302.

Consumer NFs 102-2 and OAM 320 (collectively referred to simply as NFs 102) use NWDAF analytics for network fault detection, recovery, and performance optimization. In particular, NFs 102 use the NWDAF analytics to reduce or avoid heavy loads at network components, physical or otherwise. As described below in greater detail with reference to FIGS. 4-10, NFs 102-2 may reduce or avoid heavy loads at a user plane and network slices. In some of these implementations, the system throttles network traffic for different user types: premium users or important users (e.g., users with a higher QoS), guaranteed bit rate (GBR) users (who are non-premium users), and non-GBR and non-premium users. The system may perform throttling based on a user priority level for each user types. For example, non-GBR and non-premium users have the lowest priority and premium users have the highest priority.

Figure 2:
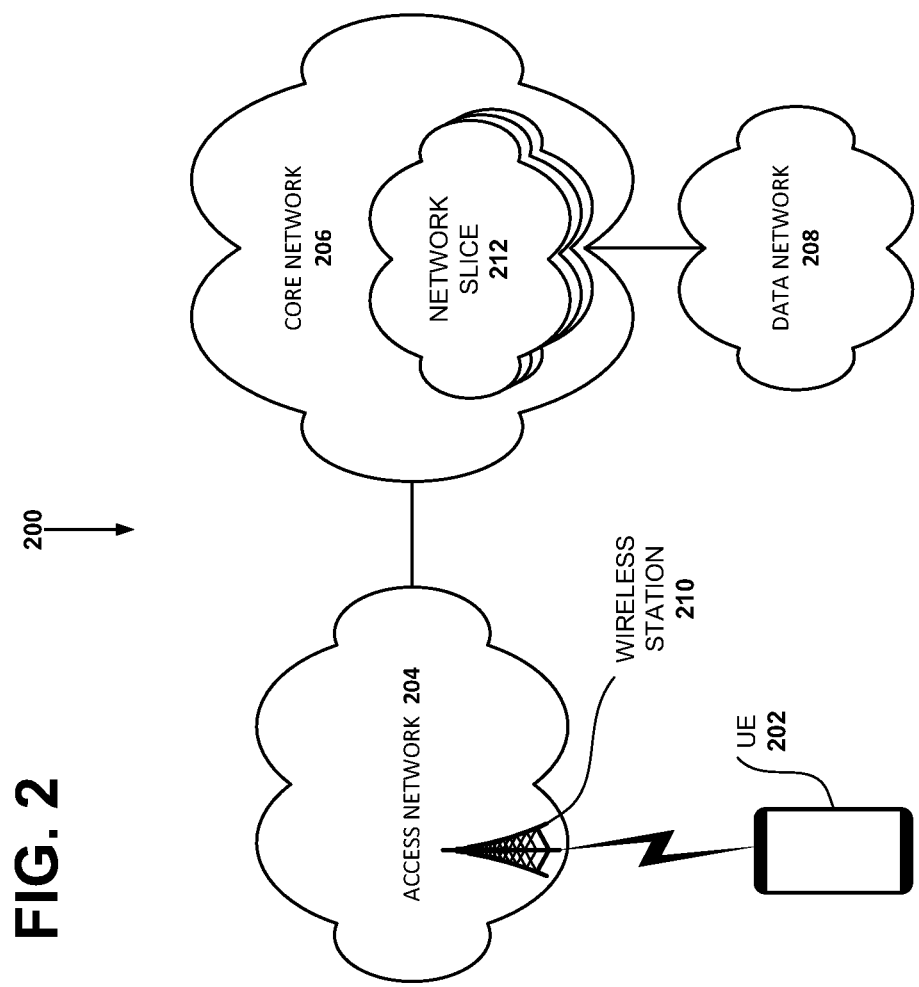
FIG. 2 illustrates an exemplary network environment in which the systems and methods for reducing loads may be implemented, according to an implementation.

FIG. 2 illustrates an exemplary network environment 200 in which system 100 of FIG. 1 may be implemented. As shown, network environment 200 may include a User Equipment device (UE) 202, an access network 204, a core network 206, and a data network 208. UE 202 may include a wireless computational communication device. Examples of UE 202 include: a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IoT) device. In some implementations, UE 202 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Access network 204 may allow UE 202 to access core network 206. To do so, access network 204 may establish and maintain, with participation from UE 202, an over-the-air channel with UE 202; and maintain backhaul channels with core network 206. Access network 204 may relay information through these channels, from UE 202 to core network 206 and vice versa. Access network 204 may include a Long-term Evolution (LTE) radio network and/or a Fifth Generation (5G) radio network or other advanced radio network. These networks may include many central units (CUs), distributed units (DUs), radio units (RUs), and wireless stations, one of which is illustrated in FIG. 2 as wireless station 210 for establishing and maintaining over-the-air channel with UE 202. Wireless station 210 may include a 4G, 5G, or another type of base station (e.g., eNB, gNB, etc.) that comprise one or more radio frequency (RF) transceivers. In some implementations, wireless station 210 may be part of an evolved Universal Mobile Telecommunications Service (UMTS) Terrestrial Network (eUTRAN).

Core network 206 may manage communication sessions of subscribers connecting to core network 206 via access network 204. For example, core network 206 may establish an Internet Protocol (IP) connection between UEs 202 and data network 208. In some implementations, core network 206 may include a 5G core network. In other implementations, core network 206 may include a 4G core network (e.g., an evolved packet core (EPC) network) or another type of core network.

The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a Virtual Network Function (VNF) virtual machine, a container, an event driven server-less architecture interface, and/or another type of SDN component. The common shared physical infrastructure may be implemented using one or more devices 1200 described below with reference to FIG. 12 in a cloud computing center associated with core network 206. Exemplary components of core network 206 are described below with reference to FIG. 3.

Data network 208 may include one or more networks connected to core network 206. In some implementations, a particular data network 208 may be associated with a data network name (DNN) in 5G, and/or an Access Point Name (APN) in 4G, and a UE 202 may request a connection to data network 208 using a DNN or APN. Data network 208 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also simply referred to as application). An application may provide services for a program or an application running on UE 202 and may establish communication session with UE 202 via core network 206.

As shown, core network 206 may include one or more network slices 212. Depending on the implementation, network slices 212, may be implemented within other networks, such as access network 204 and/or data network 208. Access network 204, core network 206, and data network 208 may include multiple instances of network slices 212. Each network slice 212 may be instantiated as a result of "network slicing," which involves a form of virtual network architecture that enables multiple logical networks to be implemented on top of a shared physical network infrastructure using SDN and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QoS) class, a type of service, and/or a particular group of enterprise customers associated with communication devices.

Each network slice 212 may be associated with an identifier, herein referred to as a Single Network Slice Selection Assistance Information (S-NSSAI). For each UE 202 that wishes to access a particular network slice, the subscription data for the UE 202 (stored in core network 206, for example) may include the S-NSSAI corresponding to the network slice.

Depending on the implementation, network environment 200 may include additional networks and components than those illustrated in FIG. 2. However, for clarity, FIG. 2 does not show all components that may be included in network environment 200 (e.g., routers, bridges, wireless access point, additional UE devices, switches, etc.).

Figure 3:
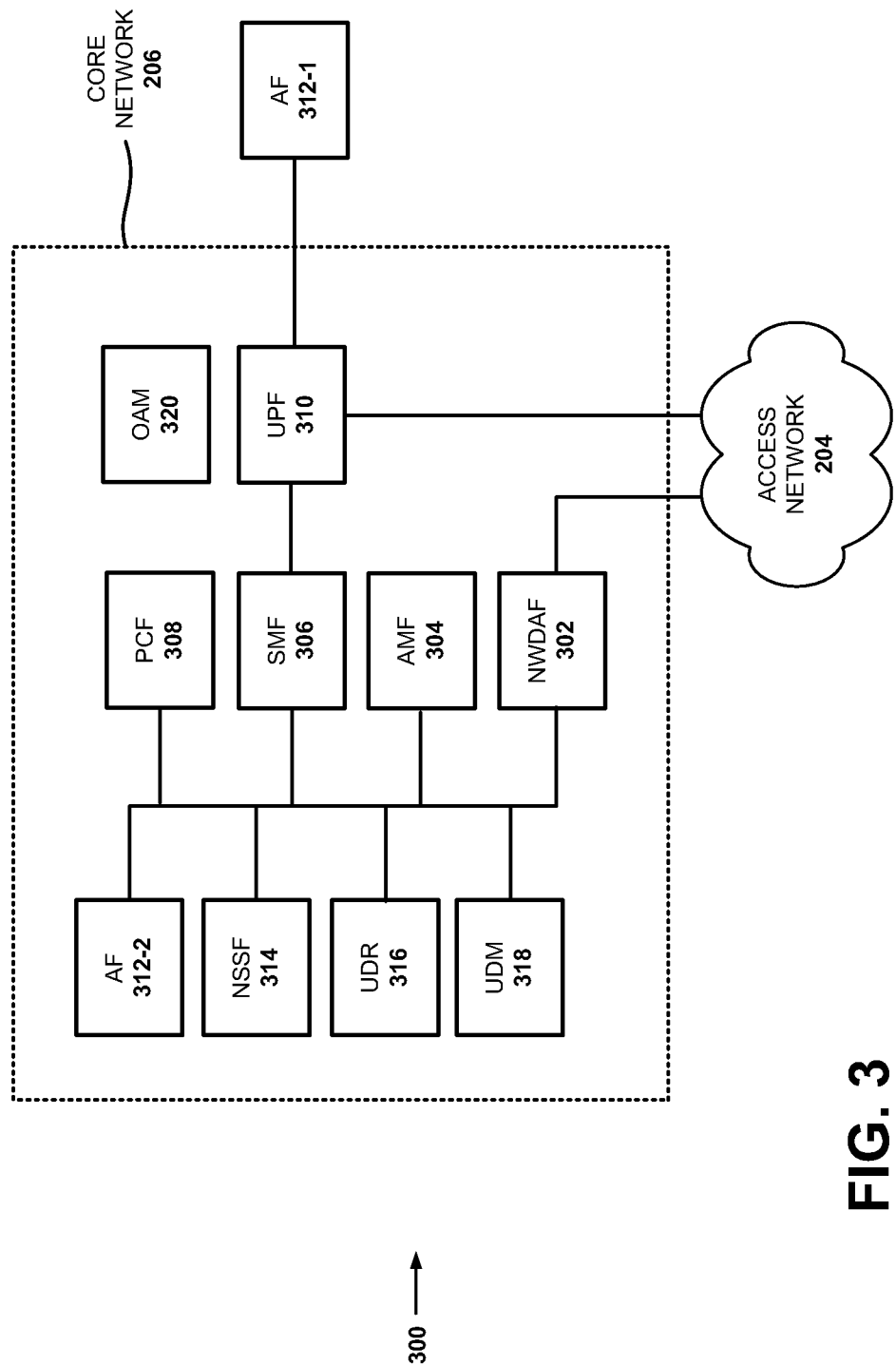
FIG. 3 depicts exemplary components of a portion of a network according to an implementation.

FIG. 3 depicts exemplary components of a portion 300 of network environment 200 according to an implementation. As shown, portion 300 may include access network 204, an application function (AF) 312-1, and a portion of core network 206. Access network 204 has been described above with reference to FIG. 2. AF 312-1 is one of what have been referred to as NFs (network functions). AF 312-1 may provide an application function that belongs to a third party (i.e., an entity different from a service provider) and provides services to UEs 202 via access network 204, core network 206, and/or data network 208.

In FIG. 3, core network 206 comprises, in addition to other components described with reference to FIG. 2, multiple NFs that are implemented in accordance with Service Based Architecture (SBA), either as hardware devices or virtual components (e.g., a container or a virtual machine). Each NF includes a particular set of network functionalities and may act as a consumer NF (an NF that receives services from an NF) or a producer NF (an NF that provides services to consumer NFs). For example, a consumer NF may receive analytics services from NWDAF 302.

As shown, core network 206 includes: an NWDAF 302, an Access and Mobility Management Function (AMF) 304, a Session Management Function (SMF) 306, a Policy Control Function (PCF) 308, a User Plane Function (UPF) 310, an AF (Application Function) 312-2, a Network Slice Selection Function (NSSF) 314, a Unified Data Repository (UDR) 316, a Unified Data Management (UDM) 318, and an OAM 320. Depending on the implementation, core network 206 may include additional, fewer, or different components than those illustrated in FIG. 3.

NWDAF 302 may collect activity data and local analytics from various network devices, components, and NFs. For example, NWDAF 302 may collect accessibility key performance indicators (KPIs) (e.g., a Radio Resource Control (RRC) setup success rate, etc.), reliability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), and/or other types of network KPIs. Additionally, NWDAF 302 may include logic that supports distribution of activity data and analytics.

In addition to KPIs, NWDAF 302 may obtain data pertaining to loads on a user plane, network slices, or network components. For example, for measuring loads on a user plane, NFs, and/or network slices, NWDAF 302 may obtain one or more of the following parameters.

UE throughput numbers, which may include: an average UE throughput, measured in kilobits per second, which may be computed by evaluating the total number of service data units (SDUs) for a particular QoS, over a time interval, at the Radio Link Control (RLC) level.

Data radio bearer (DRB) numbers: a number of DRBs attempted to be setup, a number of DRBs successfully set up, a number of active DRBs released, in-session activity time for a DRB, the number of initial DRBs attempted to set up, the initial number of DRBs successfully setup, a number of DRBs attempted to be resumed, a number of DRBs successfully resumed, a mean number of DRBs being allocated, a peak number of DRBs being allocated, and a mean number of DRBs undergoing failures.

Radio Resource Control (RRC) numbers: a mean number of RRC connections for each public land mobile network (PLMN), a maximum number of RRC connections, a mean number of stored inactive RRC connections, and a maximum number of stored inactive RRC connections.

Protocol Data Unit (PDU) Session management numbers: a number of PDU sessions requested to set up for a network slice, a number of PDU sessions successfully set up, a number of PDU sessions failed to set up, a mean number of PDU sessions being allocated, and a peak number of PDU sessions being allocated.

Radio Resource Management numbers: a total downlink (DL) physical resource block (PRB) usage, a total uplink (UL) PRB usage, a percent of available DL PRBs used, a percentage of available UL PRBs used, a mean DL PRBs used for data traffic, a mean UL PRBs used for data traffic, a total available DL PRBs, a total available UL PRBs, a peak DL PRBs used for data traffic, and a peak UL PRBs used for data traffic. A PRB may refer to a time and frequency block that may be assigned to be scheduled for transmitting/receiving signal or data. For example, a set of PRBs that span a time interval and a frequency range may be scheduled for communicating a particular number of bits from/to wireless station 210 to/from UE 202.

NF usage numbers: a virtual CPU usage for an NF, such as mean and peak values; virtual memory usage for an NF, such as mean and peak values; and a virtual disk usage for an NF, such as mean and peak values.

NWDAF 302 may collect not only the above-described data and statistics, but may also compute other parameters and KPIs, also referred to above. In addition, through machine learning (ML) based on the collected statistics, NWDAF 302 may generate predicted parameter values and forecast network conditions. The predicted conditions may include, for example, NF loading conditions and user plane congestion conditions.

NWDAF 302 may provide the KPIs, the current network parameter values, and/or the predicted parameter values to NFs 304-320 of core network 206 to reduce or avoid network congestion of a user plane, network slices, or NFs providing services to devices located in Areas of Interest (AOIs), Tracking Areas (TAs) and Registration Areas (RAs). Examples of NFs 304-318 using NWDAF 302 analytics are described below with reference to FIGS. 4-10.

AMF 304 may perform registration management, connection management, reachability management, mobility management, lawful intercepts, Short Message Service (SMS) transport between UE 202 and an SMS function, session management message transport between UE 202 and SMF 306, access authentication and authorization, location services management, support of non-3GPP access networks, and/or other types of management processes. AMF 304 may page UE 202 based on mobility category information associated with UE 202 obtained from UDM 318. In some implementations, AMF 304 may implement some or all of the functionality of managing RAN slices in wireless station 210.

SMF 306 may: perform session establishment, modification and/or release; perform IP address allocation and management; perform Dynamic Host Configuration Protocol (DHCP) functions; perform selection and control of UPF 310; configure traffic steering at UPF 310 to guide traffic to the correct destination; terminate interfaces toward PCF 308; perform lawful intercepts; charge data collection; support charging interfaces; control and coordinate charging data collection; terminate session management parts of Non-Access Stratum (NAS) messages; perform downlink data notification; manage roaming functionality; and/or perform other types of control plane processes for managing user plane data.

PCF 308 may support policies to control network behavior, provide policy rules to control plane functions (e.g., to SMF 306), access subscription information relevant to policy decisions, perform policy decisions, and/or perform other types of processes associated with policy enforcement.

UPF 310 may perform the following: maintain an anchor point for intra/inter-radio access technology (RAT) mobility (e.g., mobility across different radio access technologies; maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform Quality-of-Service (QoS) handling in the user plane; perform uplink traffic verification; perform transport level packet marking; perform downlink packet buffering; send and forwarding an "end marker" to a Radio Access Network node (e.g., wireless station 210); and/or perform other types of user plane processes.

AF 312-2 may provide services associated with a particular application, such as, for example, application on traffic routing, accessing a Network Exposure Function (NEF) (not shown), interacting with a policy framework for policy control, and/or other types of applications. In contrast to AF 312-1, AF 312-2 may reside within core network 206 and/or access network 204.

NSSF 314 may select a set of network slice instances to serve a particular UE 202, determine NSSAI or an S-NSSAI, determine a particular AMF 304 to serve a particular UE 202, and/or perform other types of processes associated with network slice selection or management. In some implementations, NSSF 314 may receive network slice-related information from a Network Slice Management Function (NSMF) (not shown) that manages network slices. The management may include instantiation, removal, and/or modification of network slices based on specifications. When an NSMF creates a network slice, the NSMF may obtain an S-NSSAI for the network slice and store the S-NSSAI via NSSF 314.

UDR 316 may store subscriber data (e.g., subscriber profile) associated with UEs 202, modify subscriber data, and/or delete subscriber data. UDM 318 may: maintain subscription information for UE 202; manage subscriptions; generate authentication credentials; handle user identification; perform access authorization based on subscription data; perform network function registration management; maintain service and/or session continuity by maintaining assignment of SMF 306 for ongoing sessions; support SMS delivery, support lawful intercept functionality; and/or perform other processes associated with managing user data. For example, UDM 318 may store subscription profiles that include authentication, access, and/or authorization information. Each subscription profile may include: information identifying UE 202; authentication and/or authorization information for UE 202; information identifying services enabled and/or authorized for UE 202; device group membership information for UE 202; and/or other types of information associated with UE 202. Furthermore, the subscription profile may include mobility category information associated with UE 202.

OAM 320 may perform functions related to operations, administration, and management or maintenance of the network. The operations-related functions of OAM 320 may include monitoring performance parameters or state parameters of the network. OAM 320 may use the monitored parameter values to detect network faults or suboptimal network conditions. The administration functions of the OAM 320 may include obtaining analytics to determine performance, for capacity planning, sustaining reliability, and/or billing. The management and/or maintenance functions may include recovery, upgrades, provisioning devices and/or services.

In some implementations, OAM 320 may provide many of NWDAF 302 functionalities. For example, OAM 320 may incorporate an analytic function and collect and/or generate network analytics and/or provide analytics to NF's 304-318. For example, in implementations described below with reference to FIGS. 4-10, OAM 320 may take the place of NWDAF 302.

Depending on the implementation, core network 206 may include additional, fewer, and/or different components than those illustrated in FIG. 3. Furthermore, depending on the implementation, in addition to the functionalities described above, the components 302-320 may include additional capabilities. Such capabilities may be implemented through modification of standard interfaces and/or addition of new interfaces for interacting with various network functions.

Figure 4:
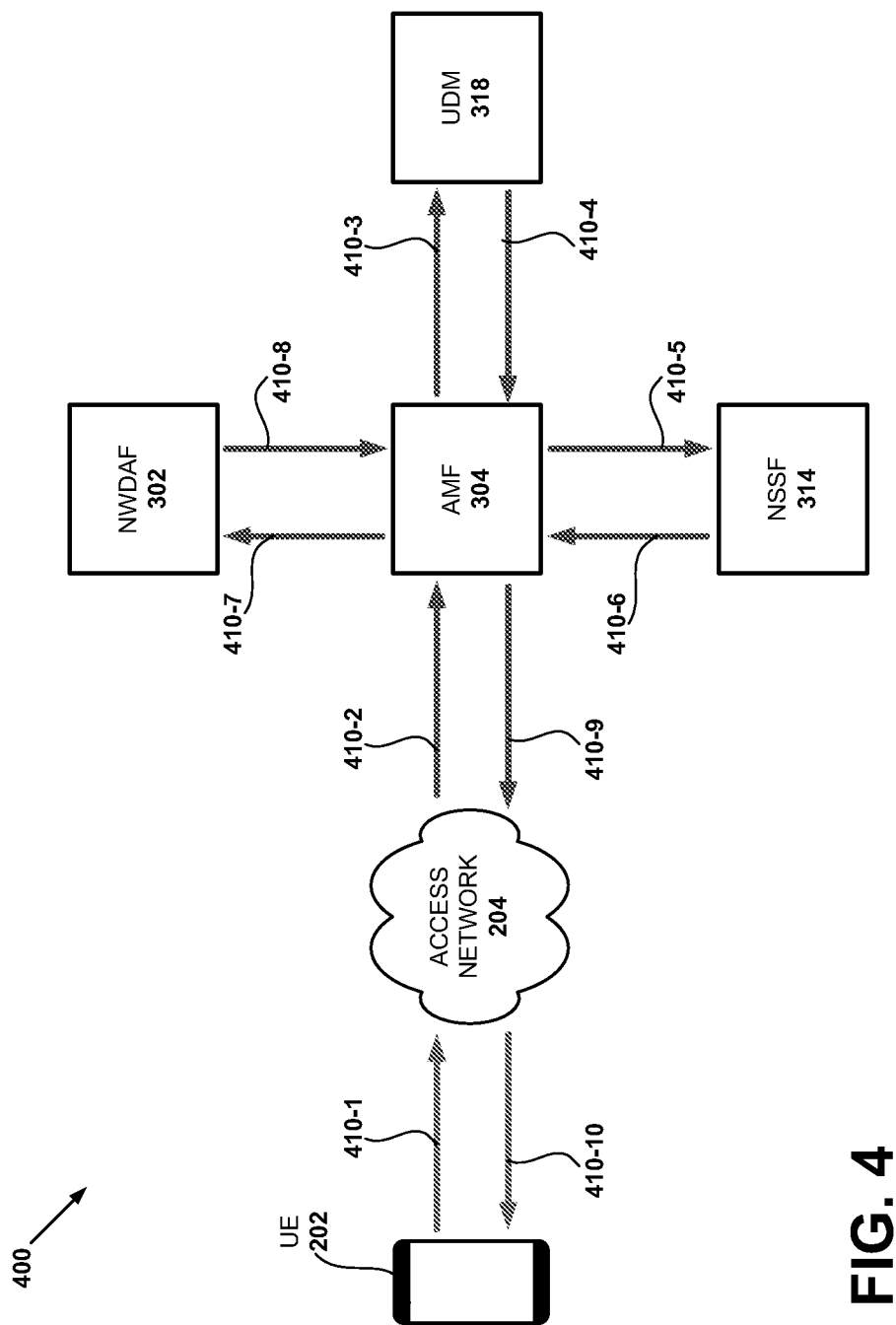
FIGS. 4-10 illustrate exemplary processing and messaging that are associated with decreasing heavy loads at various network components, according to various implementations.

FIGS. 4-10 illustrate exemplary processing and messaging that are associated with avoiding or reducing heavy loads at various network components, according to different implementations. FIG. 4 illustrates processing and messaging that are associated with avoiding or reducing heavy loads at network slices, according to an implementation. As shown, UE 202 may send a connection request 410-1 that includes an S-NSSAI and/or a network slice instance identifier (ID). The S-NSSAI and/or the network slice instance ID identifies a network slice to which UE 202 wishes to connect (or the network slice that hosts the application/service to which the application running on UE 202 is to connect).

Request 410-1 is sent to access network 204 (or to a wireless station, such as a gNB, in access network 204). Access network 204 forwards a message 410-2 to AMF 304, conveying UE 202's connection request. As such, message 410-2 carries the S-NSSAI or the network slice instance ID of the network slice to which UE 202 is to connect. Upon receipt of message 410-2, AMF 304 may proceed to establish a connection, such as checking the user subscription profile at UDM 318. Accordingly, AMF 304 sends a message 410-3 to UDM 318 and obtains a reply 410-4 that includes S-NSSAIs and/or network slice instance IDs. The S-NSSAIs and/or network slice instance IDs identify the network slices which the user is allowed to access or connect.

At AMF 304, if the S-NSSAIs and/or the network slice instance IDs in reply 410-4 include the S-SSSAI and/or the network slice instance ID requested by the UE 202 (i.e., S-NSSAI and/or the network slice instance ID in messages 410-1 and 410-2), AMF 304 sends a message 410-5 to NSSF 314, requesting NSSF 314 to identify other or all network slices that UE 202 may access, possibly to replace the allowed network slices. In response, NSSF 314 sends a reply 410-6, which includes one or more S-NSSAIs and/or network slice IDs.

Armed with a list of S-NSSAIs and/or slice instance IDs that identify network slices that UE 202 may access in place of the ones identified in the subscription profile, AMF 304 sends a request 410-7 for network analytics to NWDAF 302. The requested analytics may include, for example, statistical PDU session management numbers, statistical UE throughput numbers, predicted PDU session management numbers, and predicted UE throughput numbers for the network slices. Based on the analytics that NWDAF 302 provides in its reply 410-8, AMF 304 may determine the loads and/or predict the loads at the requested network slices. If the requested network slice is not heavily loaded or is not likely to become heavily loaded, AMF 304 may select the requested network slice as the slice to which UE 202 is to connect. Otherwise, AMF 304 may select an S-NSSAI, from the list of S-NSSAIs provided by NSSF 314, which is least loaded or is likely to not be heavily loaded.

AMF 304 may send, in its reply 410-9 to message 410-2 from access network 204, the S-NSSAI or the network slice instance ID for the selected (or allowed) network slice. Access network 204 may then relay the S-NSSAI or the network slice instance ID to UE 202 in its response 410-10 to the connection request. Thus, by AMF 304 selecting a network slice whose analytics indicate acceptable load, AMF 304 may avoid heavily loading a particular network slice.

Figure 5:
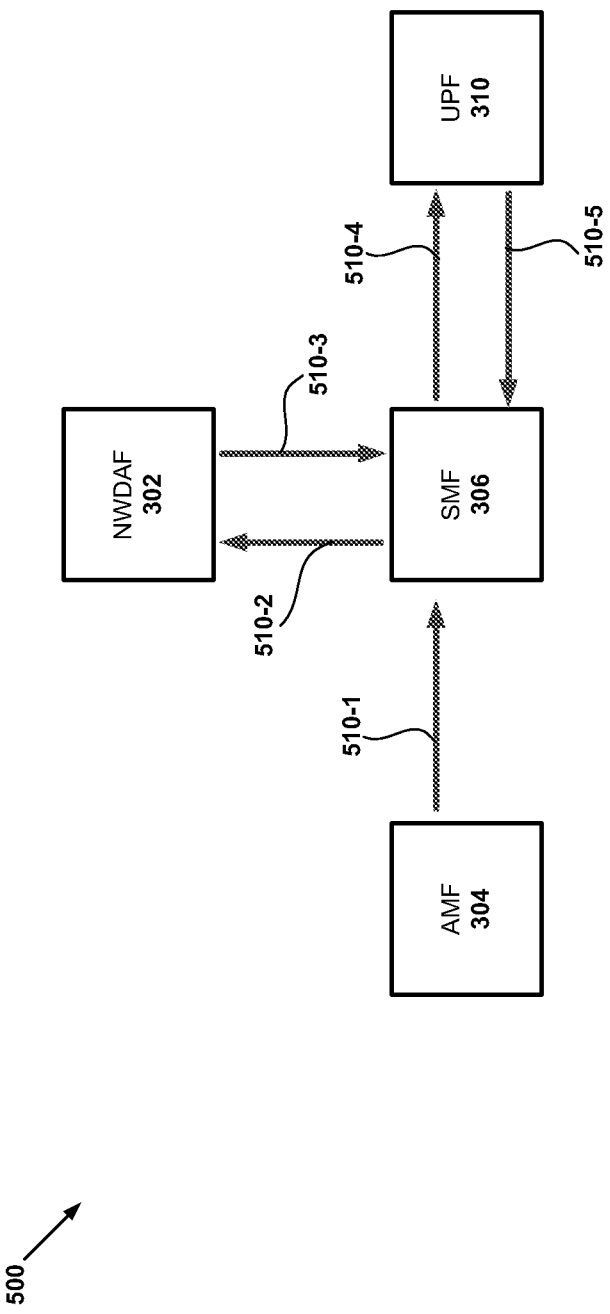

FIG. 5 illustrates processing and messaging that are associated with reducing and avoiding heavy loads at network functions, such as UPF 310. As shown, SMF 306 may receive, from AMF 304, a message 510-1 requesting a connection establishment. In response, SMF 306 may send a request 510-2 for network analytics to NWDAF 302. The requested analytics may include, for example, statistical NF usage numbers and predicted NF usage numbers for candidate UPFs 310 that are capable of proving anchors for the requested session. Based on the analytics that NWDAF 302 provides in its reply 510-3, SMF 306 may determine the loads and/or predicted loads at the candidate UPFs 310. From the candidate UPFs 310, SMF 306 may select a UPF 310 with acceptable level of load (e.g., the least load) and/or other criteria (e.g., QoS). After selecting the UPF 310, SMF 306 may send a connection establishment request 510-4 to the selected UPF 310. In response, the selected UPF 310 may set up the session and provide a response 510-5 to SMF 306. By SMF 306 selecting a UPF 310 whose analytics indicate acceptable load, SMF 306 may avoid heavily loading a particular UPF 310.

Figure 6:
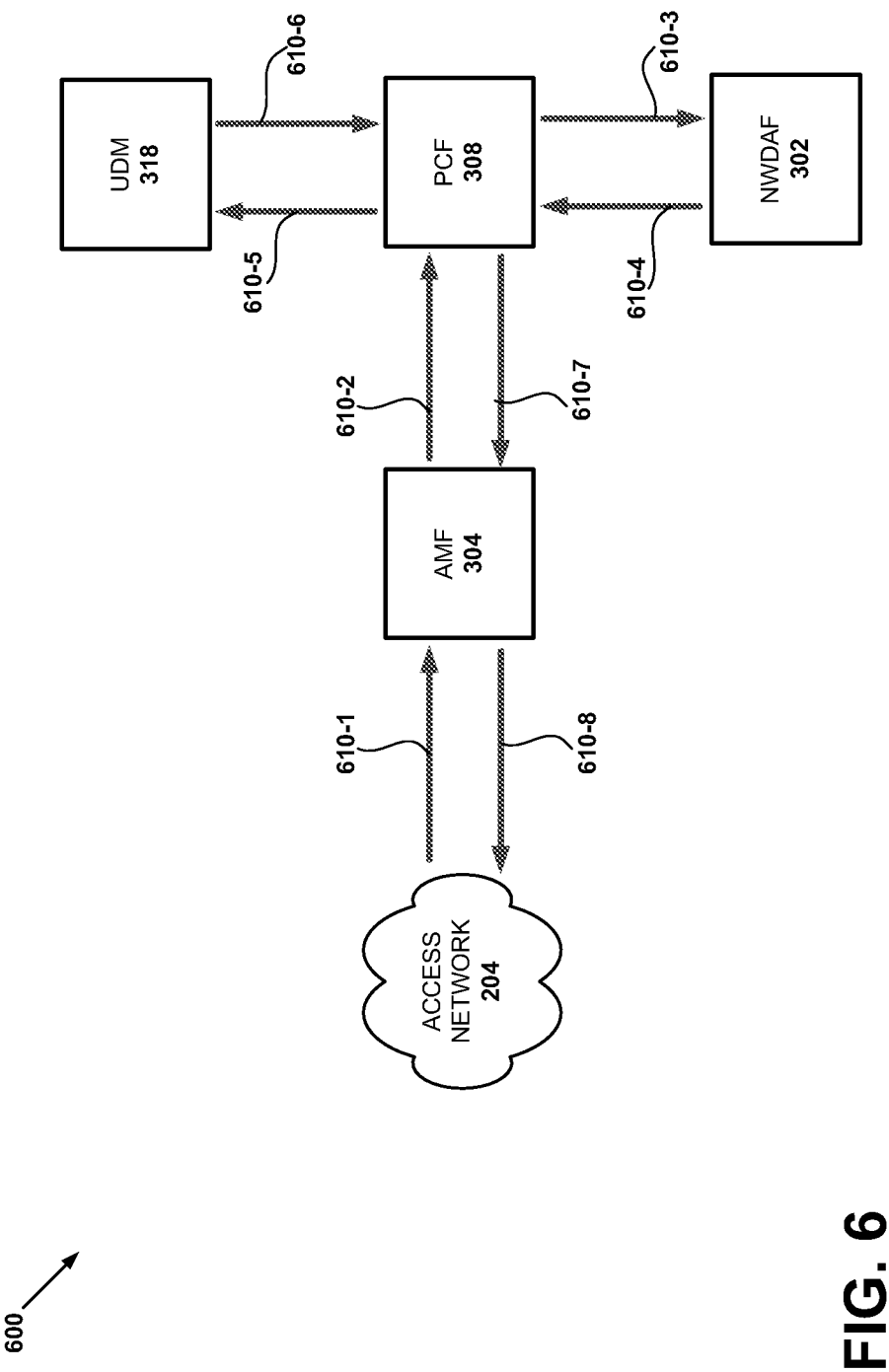

FIG. 6 illustrates processing and messaging that are associated with reducing and/or avoiding heavy loads at network elements serving an AOI, tracking area (TA), registration area (RA), and/or network slice, in different frequencies. As shown, in response to a registration or a connection request, access network 204 may forward a request 610-1 to establish a session to AMF 304. In response to request 610-1, AMF 304 requests an Access and Mobility (AM) policy association (e.g., association between a policy and a session access and mobility) and forwards a request 610-2 to create an association to PCF 308.

PCF 308 sends a message 610-3, requesting NWDAF 302 for analytics on a TA, AOI, RA, and a network slice serving the TA, AOI, and/or RA or network slice analytics for different frequency bands. To specify the TA, AOI, and/or RA, PCF 308 may include, in message 610-3, one or more TA Identifiers (TAIs). An AOI is specified by a series of TAs and an RA is specified by one or more TAIs. With message 610-3, PCF 308 may request NWDAF 302, for example, statistical UEs throughput numbers for each TA, AOI, RA, and/or network slices including different slice statistics at various frequencies or frequency bands. In reply 610-4, NWDAF 302 may provide the current statistical UEs throughput numbers and predicted UEs throughput numbers for the TA, AOI, RA, and/or network slices including different slice statistics at various frequencies and frequency bands.

When PCF 308 receives message 610-4 that provides the requested analytics from NWDAF 302, PCF 308 sends a request 610-5 to UDM 318 to obtain Radio Access Technology (RAT) Frequency Selection Priority ID (RF SP-ID) from the UE 202 subscription profile stored at UDM 318. The RFSP-ID may identify different cells and/or frequencies (with different priorities) that UE 202 may use for communication.

When UDM 318 sends a reply 610-6 with the RFSP-ID, PCF 308 may make a policy decision, based on the analytics and the RFSP-ID, to select a cell, frequency, and/or a RAT for the UE 202. PCF 308 may forward a reply 610-7 to the request 610-2, which includes information reflecting the result of the policy decision. Upon receipt of message 610-7, AMF 304 may forward, to access network 204, a message 610-8 that includes an RFSP-ID (corresponding to the decision). Access network 204 may then operate in accordance with information provided in message 610-8. The mechanism permits the network to avoid heavily loading a particular cell or a frequency band in a TA, AOI, RA, and/or a particular network slice.

Figure 7:
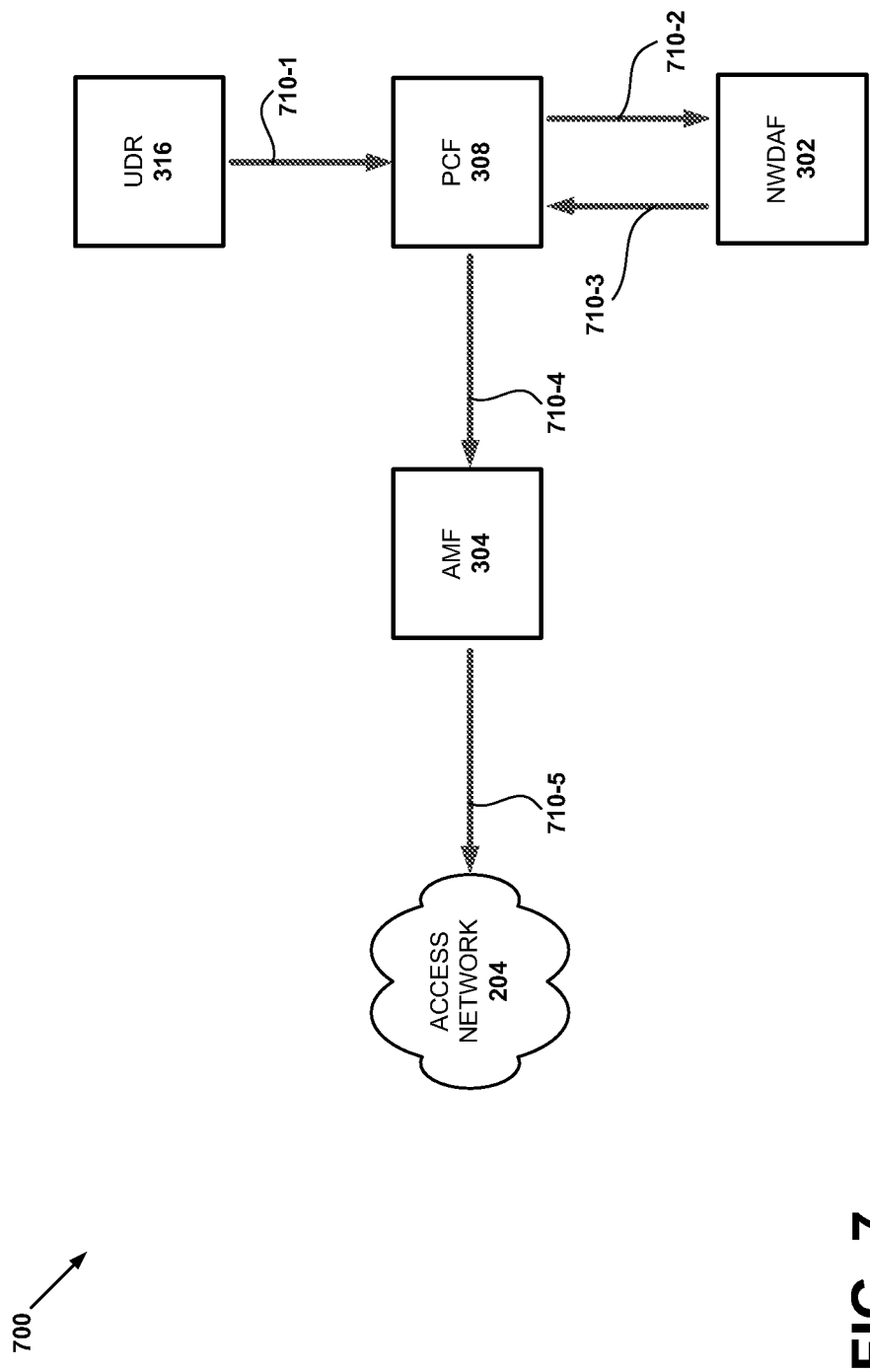

FIG. 7 illustrates processing and messaging that are associated with reducing or avoiding heavy loads at network elements on a user plane by using User Equipment Route Selection Policy (URSP) rules (also simply referred to as a URSP). For FIG. 7, assume that PCF 308 is subscribed to UDR 316's notification service. Thus, if a particular parameter stored at UDR 316 changes, PCF 308 would receive a notification of the change. Furthermore, assume that an operator or a network component (e.g., an NF) generates a new URSP rule at UDR 316 or updates a URSP rule at UDR 316.

When a new URSP is added to UDR 316 or an existing URSP rule is updated at UDR 316, UDR 316 sends a notification 710-1 that indicates a new URSP or a URSP modification at UDR 316. In response, PCF 308 may send an analytics request 710-2 to NWDAF 302. The request may specify that NWDAF 302 provide, for example, the current and predicted NF usage numbers and/or statistical UEs throughput numbers at a TA, an AOI, an RA, and/or a network slice. NWDAF 302 may provide a response 710-3 with the requested analytics.

Based on the analytics, PCF 308 may make a policy decision to accept the new or updated URSP or to further modify the URSP (e.g., change Route Selection Descriptors (RSDs) of the URSP rule) to reduce or avoid loading the network slices handling traffic for the UE 202 in the TA, RA, and/or AOI, The modified RSDs in the URSP may specify alternate or multi access technology, an alternate S-NSSAI/network slice instance ID, a different data network name (DNN) associated with the network slice or data network 208 for servicing the UE 202, or a different locations (specified by TAs) for particular time windows. After making the policy decision, PCF 308 may forward the resulting URSP in a message 710-4 to AMF 304. AMF 304 may send a message 710-5 to access network 204 to schedule a download of the new or updated URSP to the UE 202. In a different implementation, PCF 308 may schedule, with an Over-the-AIR (OTA) server, a download of the resulting URSP to the UE 202. The OTA server may then deliver the new or updated URSP to the UE 202 via access network 204. If PCF 308 makes any modifications to the URSP, PCF 308 request UDR 316 to store the updated URSP. The update is not shown in FIG. 7.

After the URSP update, the UE 202 may attempt a session update or its registration procedure to: target or request a different network slice or data network 208 (e.g., with an updated DNN) for its sessions; change its RAT access; and/or UE cell location. By having UE 202 use the URSP resulting from the policy decision at PCF 308, the network may avoid or reduce heavily loading a particular network slice or a network identified by a DNN/Access Point Name (APN).

Figure 8:
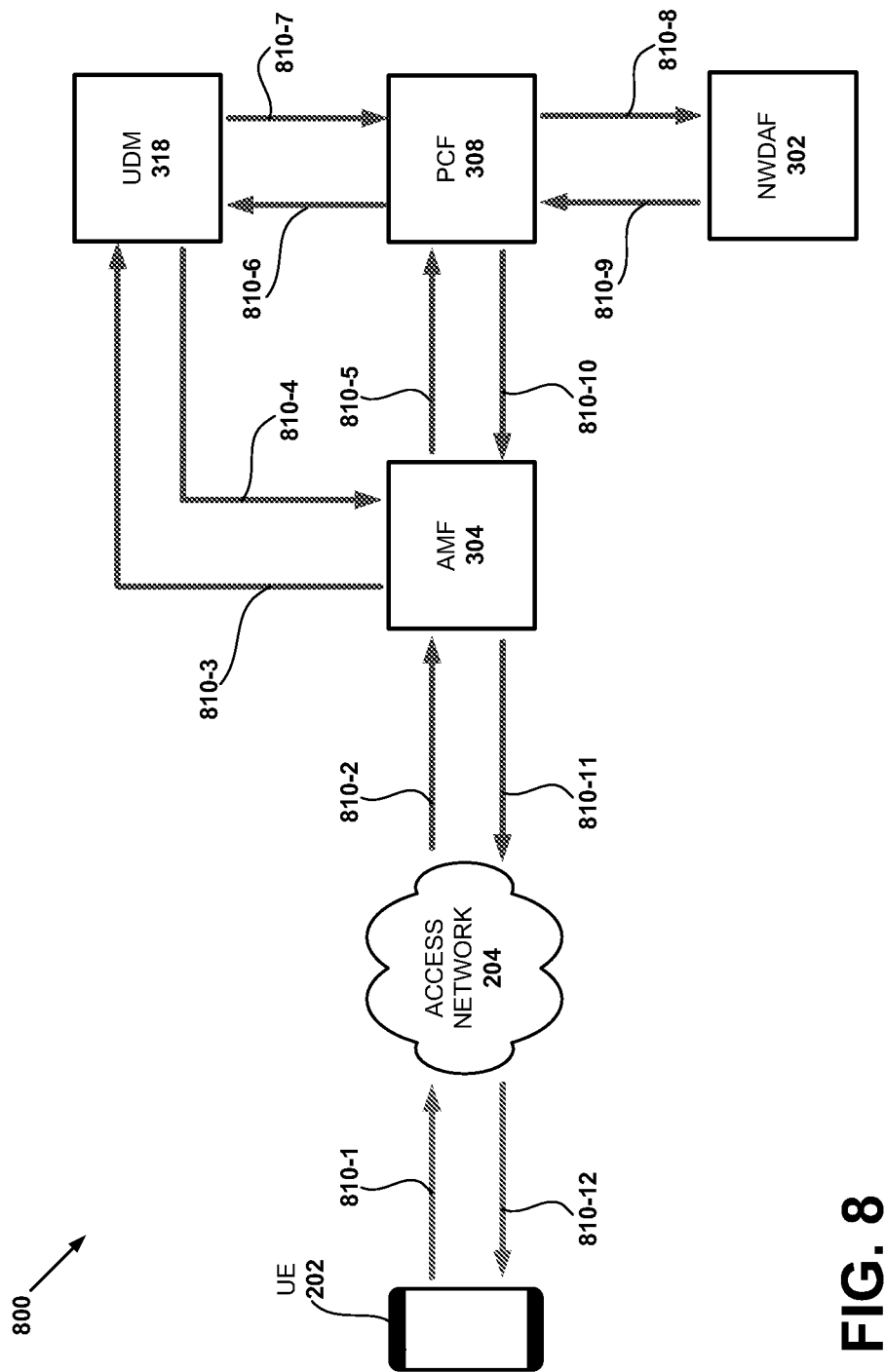

FIG. 8 illustrates processing and messaging that are associated with reducing or avoiding heavy loads at network elements by restricting UE 202 entry into a heavily loaded service area. As shown, UE 202 may send a request 810-1 for a PDU session to access network 204, which then forwards a message 810-2 to AMF 304 to establish a session. When AMF 304 receives the message 810-2, AMF 304 sends a query 810-3 to UDM 318 to provide AMF 304 with subscription information, including information on service area (SA) restrictions. UDM 318 provides a response 810-4.

AMF 304 also requests PCF 308 (with a message 810-5) to create an association between a policy and the session. PCF 308 queries and obtains subscription information from UDM 318 (messages 810-6 and 810-7), after which PCF 308 obtains user plane analytics from NWDAF 302 (messages 810-8 and 810-9). Based on the current statistical values and predicted values of parameters of network elements, PCF 308 renders a policy decision, which it forwards to AMF 304 (see message 810-10). The decision may result in a new SA policy or an updated SA policy, which message 810-10 conveys to AMF 304. AMF 304 either allows the session to be established or denies the session based on the SA policy specified in message 810-10.

If the policy results in a restriction different from the policy or restrictions indicated in the subscription profile, AMF 304 forwards the new or updated SA restrictions to access network 204 (see message 810-11). Access network 304 then forwards the new/updated restrictions 810-12 to UE 202, which may store the new SA policy or restrictions. AMF 304 may also update UDM 318 (messages not shown in FIG. 8). Through a new SA policy or new SA restrictions, the network may avoid or reduce loading a network slice and/or other components that are associated with providing services to UE 202 at a particular SA.

Figure 9:
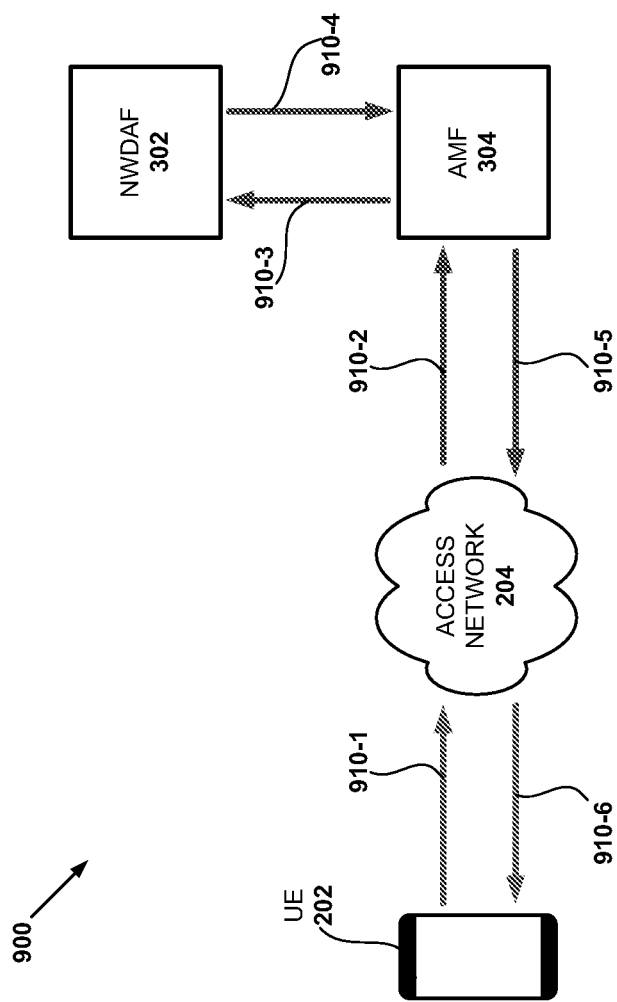

FIG. 9 depicts processing and messaging that are associated with reducing or avoiding heavy loads at network elements by restricting UE 202 registration area. As shown, UE 202 may send a registration request 910-1 to access network 204, which then forwards a message 910-2 to AMF 304 for registration of UE 202. When AMF 304 receives the message 910-2, AMF 304 sends a query 910-3 to NWDAF 302 for analytics needed to determine loads at the registration area (which may be designated by TAIs). Then NWDAF 302 provides a message 910-4 with the current statistical and predicted parameter values (e.g., a number of registration requests, a number of successful registrations, a number of session requests and sessions established, or other parameters at a cell or TA). AMF 304 then determines the load at the RA. AMF 304 then sends a registration reply 910-5 to access network 204. Reply 910-5 may indicate, for example, that the registration is completed or not, as well as any restrictions on TAs or cells at which UE 202 is temporarily or permanently restricted for registration. Access network 204 may forward a message 910-6 to UE 202. Message 910-6 may carry the same TA and cell restriction information as message 910-5. UE 202 may store and/or use the information to avoid registration with heavily loading the designated cells, tracking areas, and/or network slices associated with the RA.

Figure 10:
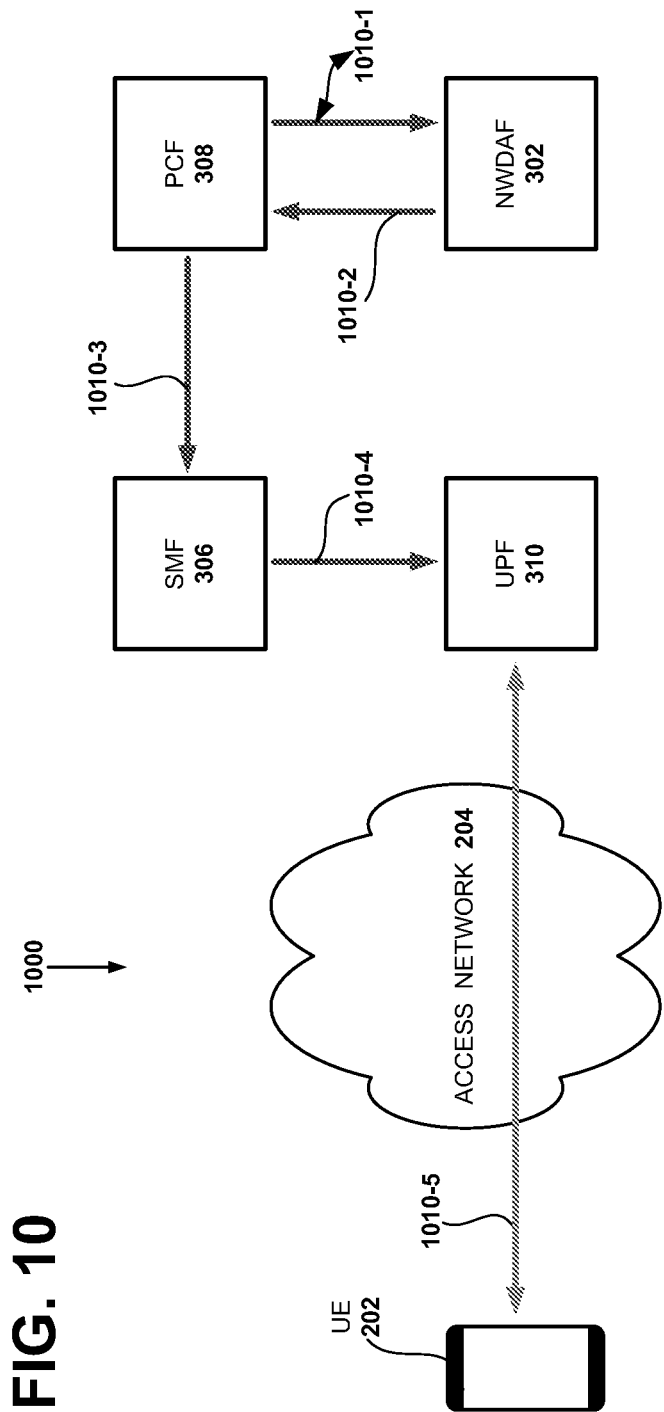

FIG. 10 illustrates processing and messaging that are associated with reducing and/or avoiding heavy loads per network slice or UE location, by tiered throttling of UE 202 traffic based on QoS levels. For FIG. 10, assume that there are different types of service parameters or user types: premium users or important users (e.g., users with a higher QoS), guaranteed bit rate (GBR) users (who are non-premium users), and non-GBR and non-premium users. When rendering the same type of services to the users of different QoS, the order of priority may be as follows: premium users, GBR users, and non-GBR and non-premium users. When system 1000 detects heavy loads, system 1000 throttles the user data traffic in the order of user priority. Throttling can be done by reducing the UE-Aggregate Maximum Bit rate (AMBR) and/or the UE Slice-(Maximum Bit Rate) MBR.

As shown, PCF 308 subscribes to NWDAF 302 to receive any notification about heavy loading associated with a location (e.g., TA) or a network slice (messages 1010-1). When NWDAF 302 detects heavy loads or a predicted heavy loads at a particular location or at a network slice or at a slice in a particular location or frequency band, NWDAF 302 forwards a notification 1010-2 to PCF 308. Notification 1010-2 may include analytics, such as the current loads or predicted loads associated with the particular UE location or the particular network slice or at a slice in a particular location or frequency band and a list of users who are consuming the most bandwidth (e.g., generating most traffic).

Upon receipt of the notification 1010-2, PCF 308 may update its policy rules for each of the heavy users, in message 1010-3. The policy may reflect the user priority. For example, the policy may require throttling data transfer for only non-GBR users—assuming no other user data flows are currently being throttled. If non-GBR user data flows are already being throttled, the new policy rule may dictate that GBR user data flows to be throttled. If non-GBR users and GBR user data flows are both being throttled, then the policy rule may dictate that the premium user data flows be throttled. That is, each updated policy rule may reflect throttling user data flows progressively, from the lowest priority user data flows to the highest priority user data flows.

When SMF 306 receives message 1010-3, SMF 306 may enforce the policy, by forwarding instructions 1010-4 to UPF 310. When UPF 310 receives throttling instructions 1010-4 from SMF 306, UPF 310 may throttle the flows 1010-5 (e.g., from UE 202 to UPF 310).

If NWDAF 302 still detects heavy loads either at the particular UE location or at a network slice after a particular time interval, NWDAF 302 may issue a new notification 1010-2—which may include a new list of top heavy users. PCF 308 may then update its policy rule, to drive the progressive throttling. The process in FIG. 10 may continue, until the current or predicted heavy load for the network slice or the location is reduced to acceptable levels. If the loads fall to such levels, NWDAF 302 may notify PCF 308, which may push new policy rules to discontinue data throttling, in the reverse order that the user data were throttled (e.g., the highest priority user data is unthrottled prior to data for lower priority user data).

Figure 11:
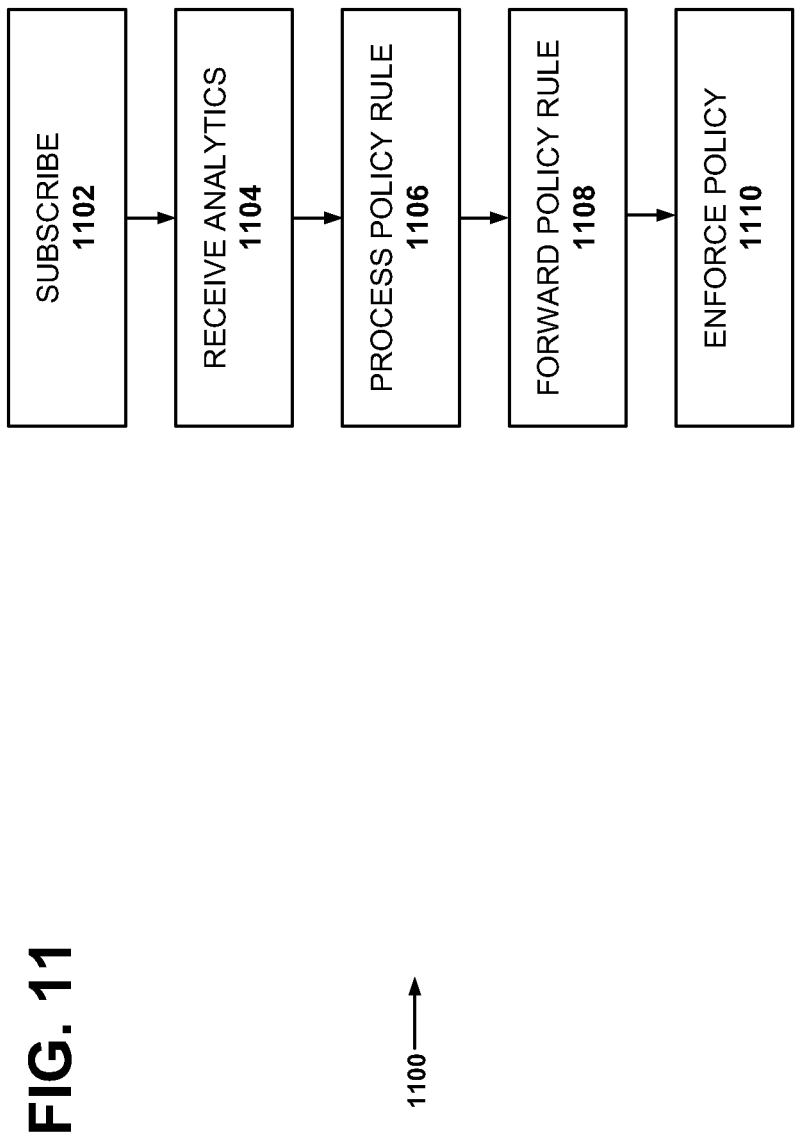
FIG. 11 illustrates a flow diagram of a process associated with decreasing heavy loads at various network components, according to an implementation.

FIG. 11 is a flow diagram of a process 1100 associated with reducing or avoiding heavy loads at network elements or constructs, according to an implementation. Process 1100 may be performed by one or more network components, such as those shown FIGS. 1-3. As shown, process 1100 may include a network component subscribing to NWDAF 302 for its notification service (1102). For example, PCF 308 may subscribe to NWDAF 302 to provide network analytics.

Process 1102 may further include the network component receiving network analytics from NWDAF 302 (block 1104). For example, PCF 308 may receive network analytics from NWDAF 302. NWDAF 302 may have forwarded the NWDAF analytics as a result of the subscription, or as a result to a message requesting the analytics.

Process 1100 may further include the network component processing a network policy (block 406). For example, PCF 308 may generate a network policy based on the received network statistics that indicate that a network slice 212 or another network component associated with a RA, TA, SA, or a frequency band is heavily congested or that a particular UE 102 is served by loaded NFs. In another example, SMF 306 may process a policy rule received from PCF 308.

Process 1100 may further include forwarding the policy rule (block 1108) to a policy enforcement NF. For example, after generating the policy rule, PCF 308 may forward the policy rule to AMF 304, SMF 306, or to another network component. As a result of receiving the policy rule, the recipient (e.g., AMF 304, SMF 306, etc.) may enforce the rule (block 1110). For example, SMF 306 may message UPE 310 to throttle a particular session; send a message to a RAN component to restrict UE admissions at particular areas.

Figure 12:
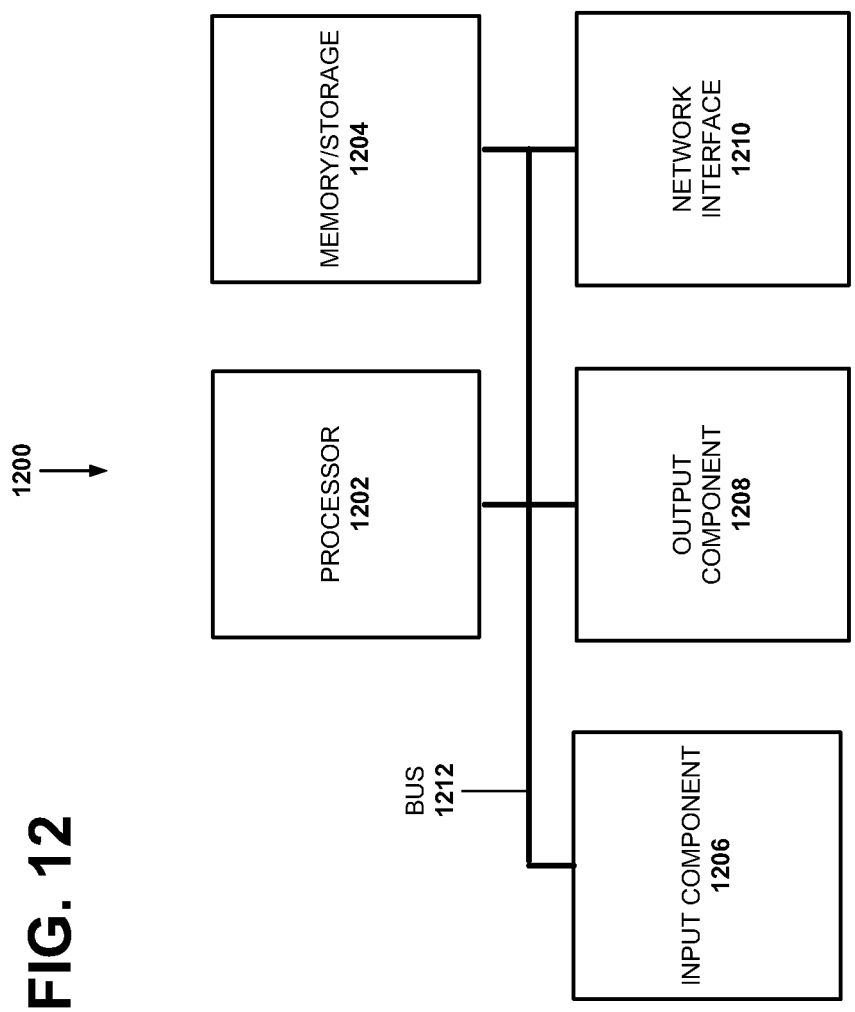
FIG. 12 depicts exemplary components of an exemplary network device.

FIG. 12 depicts exemplary components of an exemplary network device 1200. Network device 1200 may correspond to or be included in any of the devices and/or components illustrated in FIGS. 1-10 (e.g., UE 202, access network 204, core network 206, data network 208, NFs 302-320, etc.). In some implementations, network devices 1200 may be part of a hardware network layer on top of which other network layers and NFs may be implemented.

As shown, network device 1200 may include a processor 1202, memory/storage 1204, input component 1206, output component 1208, network interface 1208, and communication path 1202. In different implementations, network device 1200 may include additional, fewer, different, or different arrangement of components than the ones illustrated in FIG. 12. For example, network device 1200 may include line cards, switch fabrics, modems, etc.

Processor 1202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 1200 and/or executing programs/instructions.

Memory/storage 1204 may include static memory, such as read only memory (ROM), and/or dynamic memory, such as random access memory (RAM), or onboard cache, for storing data and machine-readable instructions (e.g., programs, scripts, etc.).

Memory/storage 1204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1204 may be external to and/or removable from network device 1200. Memory/storage 1204 may include, for example, a Universal Serial Bus (USB) memory stick, a dongle, a hard disk, off-line storage, a Blu-Ray® disk (BD), etc. Memory/storage 1204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1206 and output component 1208 may provide input and output from/to a user to/from network device 1200. Input/output components 1206 and 1208 may include a display screen, a keyboard, a mouse, a speaker, a microphone, a camera, a DVD reader, USB lines, and/or other types of components for obtaining, from physical events or phenomena, to and/or from signals that pertain to network device 1200.

Network interface 1210 may include a transceiver (e.g., a transmitter and a receiver) for network device 1210 to communicate with other devices and/or systems. For example, via network interface 1210, network device 1200 may communicate over a network, such as the Internet, an intranet, cellular, a terrestrial wireless network (e.g., a WLAN, WiFi, WiMax, etc.), a satellite-based network, optical network, etc. Network interface 1210 may include a modem, an Ethernet interface to a LAN, and/or an interface/connection for connecting network device 1200 to other devices (e.g., a Bluetooth interface).

Communication path or bus 1212 may provide an interface through which components of network device 1200 can communicate with one another.

Network device 1200 may perform the operations described herein in response to processor 1202 executing software instructions stored in a non-transient computer-readable medium, such as memory/storage 1204. The software instructions may be read into memory/storage 1204 from another computer-readable medium or from another device via network interface 1210. The software instructions stored in memory/storage 1204, when executed by processor 1202, may cause processor 1202 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of messages, signals, and acts have been described with FIGS. 4-10, the order of the messages, signals, and acts may be modified in other implementations. In addition, non-dependent messages, signals, and acts may represent messages, signals, and acts can be sent, received, and/or performed in parallel and in different orders.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices that implement network functions (NFs) that comprise:
   a network data analytics function (NWDAF) configured to:
      provide first analytics to a policy control function (PCF); and
   the PCF configured to:
      receive the first analytics from the NWDAF;
      generate a first policy rule based on the first analytics; and
      forward the generated first policy rule to a network component to process the first policy rule at the network component,
   wherein processing the first policy rule at the network component reduces network traffic to or from one or more User Equipment devices (UEs) in a geographical area,
   wherein each user of the UEs is associated with a priority level that includes one of:
   a priority level of a premium user;
   a priority level of a guaranteed bit rate (GBR) user; or
   a priority level of a non-GBR and non-premium user; and
   wherein the priority level of the premium user is higher than the priority level of the GBR user, and the priority level of the GBR user is higher than the priority level of the non-GBR and non-premium user.

2. The system of claim 1, wherein the geographical area includes one or more of:
a tracking area (TA);
an area of interest (AOI) identified by one or more TA identifiers (TAIs);
a service area (SA); or
a registration area (RA).

3. The system of claim 1, wherein when processing the first policy at the network component, the network component is configured to:
send a Radio Frequency Selection Priority Identifier (RFSP-ID) to one of the UEs.

4. The system of claim 3, wherein the PCF is further configured to:
obtain an RFSP-ID, stored in a subscription profile, which is associated with the one of the UEs via a Unified Data Management (UDM) component.

5. The system of claim 1, wherein the first policy rule includes one of:
an updated User Equipment Route Selection Policy (URSP) rule; or
a new URSP.

6. The system of claim 5, wherein the network component is configured to:
provide the URSP to one of the UEs, and wherein the network component comprises one of:
an access and mobility management function (AMF); or
an Over-the-AIR (OTA) server.

7. The system of claim 1, wherein the first policy rule instructs NFs to throttle network traffic to or from the UEs based on the priority level of each users of the UEs.

8. The system of claim 7, wherein the first analytics indicate that a user plane or a network slice has a heavy load, and wherein the first policy rule instructs one or more of the NFs to throttle network traffic to or from UEs of non-GBR and non-premium users.

9. The system of claim 8, wherein the PCF is further configured to:
receive second analytics from the NWDAF, wherein the second analytics indicate that the user plane or the network slice continues to have a heavy load; and
issues a second policy rule, wherein the second policy rule instructs the one or more of the NFs to throttle network traffic to or from UEs of GBR users.

10. The system of claim 9, wherein the PCF is further configured to:
receive third analytics from the NWDAF, wherein the third analytics indicate that the user plane or the network slice continues to have a heavy load; and
issues a third policy rule, wherein the third policy rule instructs the one or more of the NFs to throttle network traffic to or from UEs of premium users.

11. The system of claim 1, wherein the network component comprises a session management function (SMF) configured to:
instruct User Plane Function (UPF) to throttle network to and from one of the UEs.

12. A method comprising:
providing, by a network data analytics function (NWDAF), first analytics to a policy control function (PCF);
receiving, by the PCF, the first analytics from the NWDAF;
generating, by the PCF, a first policy rule based on the first analytics; and forwarding, by and from the PCF, the generated first policy rule to a network component to process the first policy rule at the network component,
wherein processing the first policy rule at the network component reduces network traffic to or from one or more User Equipment devices (UEs) in a geographical area;
wherein each user of the UEs is associated with a priority level that includes one of:
a priority level of a premium user;
a priority level of a guaranteed bit rate (GBR) user; or
a priority level of a non-GBR and non-premium user; and
wherein the priority level of the premium user is higher than the priority level of the GBR user, and the priority level of the GBR user is higher than the priority level of the non-GBR and non-premium user.

13. The method of claim 12, wherein the geographical area includes one or more of:
a tracking area (TA);
an area of interest (AOI) identified by one or more TAIs;
a service area (SA); or
a registration area (RA).

14. The method of claim 12, wherein processing the first policy at the network component includes:
sending a Radio Frequency Selection Priority Identifier (RFSP-ID) from the network component to one of the UEs.

15. The method of claim 14, further comprising:
obtaining, by the PCF, an RFSP-ID, stored in a subscription profile, which is associated with the one of the UEs via a Unified Data Management (UDM) component.

16. The method of claim 12, wherein the first policy rule includes one of:
an updated User Equipment Route Selection Policy (URSP) rule; or
a new URSP.

17. The method of claim 12, wherein the first policy rule instructs network functions (NFs) of the network to throttle network traffic to or from the one or more UEs based on the priority level of each of the users of the UEs.

18. The method of claim 17, wherein the first analytics indicate that a user plane or a network slice has a heavy load, and wherein the first policy rule instructs one or more of the NFs to throttle network traffic to or from UEs of non-GBR and non-premium users.

19. The method of claim 18, further comprising:
receiving, by the PCF, second analytics from the NWDAF, wherein the second analytics indicate that the user plane or the network slice continues to have a heavy load; and
issuing, by the PCF, a second policy rule, wherein the second policy rule instructs the one or more of the NFs to throttle network traffic to or from UEs of GBR users.

20. A non-transitory computer-readable medium comprising computer-executable instructions, when executed by one or more processors, cause the one or more processors to implement network functions (NFs) that comprise:
a network data analytics function (NWDAF) configured to:
provide first analytics to a policy control function (PCF); and
the PCF configured to:
receive the first analytics from the NWDAF;
generate a first policy rule based on the first analytics; and forward the generated first policy rule to a network component to process the first policy rule at the network component, wherein processing the first policy rule at the network component reduces network traffic to or from one or more User Equipment devices (UEs) in a geographical area wherein processing the first policy rule at the network component reduces network traffic to or from one or more User Equipment devices (UEs) in a geographical area, wherein each user of the UEs is associated with a priority level that includes one of:

a priority level of a premium user;

a priority level of a guaranteed bit rate (GBR) user; or a priority level of a non-GBR and non-premium user; and wherein the priority level of the premium user is higher than the priority level of the GBR user, and the priority level of the GBR user is higher than the priority level of the non-GBR and non-premium user.

* * * * *